Figure 1:
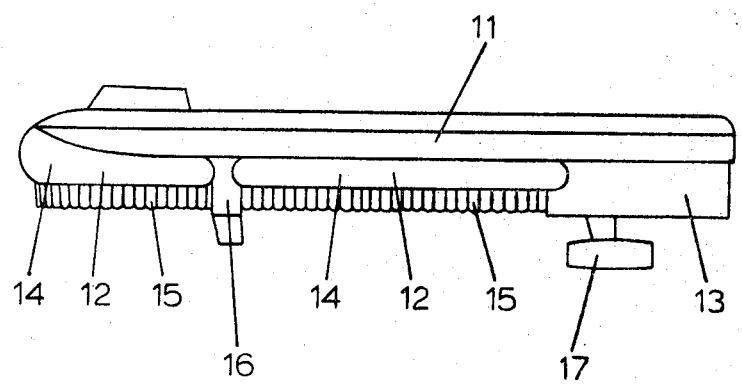

//  # United States Patent [19]

Crewe

[11] 3,837,314
[45] Sept. 24, 1974

[54] FLUID CUSHION SUPPORTED VEHICLES
[75] Inventor: Peter Rowland Crewe, Newport, England
[73] Assignee: British Hovercraft Corporation, Yeovil, England
[22] Filed: Feb. 7, 1973
[21] Appl. No.: 330,415

[30] Foreign Application Priority Data
Feb. 14, 1972  Great Britain...................... 6688/72

[52] U.S. Cl.............................. 114/67 A, 180/127
[51] Int. Cl.............................................. B63b 1/34
[58] Field of Search........... 114/66.5 H, 67 R, 67 A; 180/127, 128; 115/11, 12 A, 12 R

[56] References Cited
UNITED STATES PATENTS
3,265,027  8/1966  Brown et al. .................. 114/66.5 H
3,343,513  9/1967  Bader............................. 114/66.5 H
3,465,844  9/1969  Page et al. ........................... 180/127
3,472,193  10/1969  Bernaerts........................... 114/67 A
3,583,520  6/1971  Kipritznikoff....................... 180/127
3,590,763  7/1971  Hunt................................. 114/67 A FOREIGN PATENTS OR APPLICATIONS
1,189,858  4/1962  Germany ........................... 114/67 A Primary Examiner—Trygve M. Blix
Assistant Examiner—Stuart M. Goldstein
Attorney, Agent, or Firm—Larson, Taylor & Hinds

[57]  ABSTRACT

A fluid cushion supported vehicle is provided with control surfaces for improving the directional stability and control of the vehicle. The control surfaces, which are provided on either side of the longitudinal center line of the vehicle and forward of the lateral center line of the vehicle, may also act as support structure for the flexible skirt assembly.

7 Claims, 6 Drawing Figures

FLUID CUSHION SUPPORTED VEHICLES

This invention concerns fluid cushion supported vehicles, and is more particularly concerned with means for improving the stability and directional control of such vehicles. A secondary purpose is to improve seaworthiness and habitability by improving pitch and roll control.

Various means are used to achieve directional control of fluid cushion supported vehicles, these include aerodynamic control surfaces, thrust producing devices and lift vectoring devices. These means have various advantages and disadvantages well known to those skilled in the art. The degree of directional stability required is to some extent a matter of opinion since cushion supported vehicles encounter a wide range of conditions. For example, large cushion supported vehicles of a type having the cushion contained by a flexible skirt extending around the periphery of the cushion area are often operated in open sea cross wind conditions at a considerable angle of sideslip to the direction of motion relative to the water. This may reduce control demands upon the Commander, but not be the best operational mode from other aspects, such as resistance and skirt wear.

Large cushion supported vehicles of the type having the cushion contained by a flexible skirt extending around the periphery of the cushion area are normally operated in open seas with a nose-up trim in order to avoid problems of plough-in. There is thus an inherent resistance to lateral movement at the rear of the vehicle due to contact between the rear skirt and the water.

Fluid cushion supported vehicles having either air or water reactive propulsion mechanisms and associated control devices, situated only towards the rear of the craft may thereby provide lateral forces, or resistance to lateral movement, at the rear of the vehicle. If these lateral resistances or other lateral forces are not matched by a resistance to lateral movement located towards the front of the vehicle, the front of the vehicle is able to skid laterally and allow the vehicle to deviate from the straight course or manoeuvre initiated by controls at the rear, as selected by the Commander.

Further, as is well known in the science of mechanics, a propulsive effort applied to a mass behind the centre of gravity of the mass results in a directionally unstable movement of the mass.

Cushion supported vehicles of the type having rigid sidewalls along the whole lengths of their longitudinal sides and flexible skirts around the bow and across the rear have similar lateral force characteristics at the rear, due to the rear parts of the rigid sidewalls or associated marine propulsion components being immersed in the water.

Although the forward portions of the rigid sidewalls can provide a resistance to lateral movement at the front of the vehicle they are in principle too powerful and can, as slight changes of trim give large variations in the longitudinal position of the centre of lateral resistance, initiate severe directional instability and drag if they dig into the water.

With all the herein mentioned types of fluid cushion supported vehicles continual movement of the directional or pitch and roll control devices as appropriate, by the vehicle Commander, are necessary, to keep the vehicle on a desired track. These continual movements result in increased drag and a higher consumption of fuel. Further, the concentration needed to keep a lively vehicle on a selected heading is trying for the Commander.

The flexible skirt assembly around the bow of a fluid cushion supported vehicle receives impact loads caused by waves into which the vehicle is heading, and aerodynamic loads generated by forward movement of the vehicle. Against this may be set an inherent strength of the bow skirt due to its curved shape. In contrast, skirts along the longitudinal sides of the vehicle suffer less wave impact loads and have little aerodynamic load imposed on them due to forward movement of the vehicle. However, they are straight, and, therefore, do not have the benefit of strength from a curve as do the bow skirts. Thus the design parameters for the bow skirts differ from those for the side skirts. A weak point exists, however, where the bow and side skirts meet, and it is advantageous to supply additional support for the skirt at these two points.

The term "fluid" is used to indicate that any suitable gas or mixture of gases, for example air, may be used to form the vehicle supporting cushion which can be supplemented by the addition of a liquid such as water.

According to the invention, I provide a vehicle which during operation receives support from a cushion of pressurized fluid situated beneath the vehicle, the vehicle having propulsion means, means of directional control, and means depending downwardly from and extending around the periphery of the vehicle to prevent escape of the cushion of pressurized fluid, said means for preventing escape of the cushion around the vehicle bow and along at least part of the vehicle longitudinal sides comprising flexible skirt means, wherein at least two reaction control surfaces shaped so as to give minimum resistance to forward movement of the vehicle and maximum resistance to lateral movement of the vehicle are positioned one on either side of the vehicle longitudinal center line and forward of the vehicle lateral center line, at that point on each side of the vehicle where the flexible skirt means extending around the vehicle bow meets the flexible skirt means extending along the vehicle longitudinal sides so as to act as support structure for the flexible skirt means at these points, and so as to extend downwardly from rigid structure of the vehicle and penetrate a water surface over which the vehicle is travelling to provide a component of directional stability.

The vehicle may have rigid sidewall members along those parts of the longitudinal sides which are at the rear end of the vehicle, or the vehicle may be fully skirted. The rigid sidewall members may penetrate or plane over the water surface when the vehicle is cushion born. The propulsion means may comprise water jet propulsion units which extend downwardly beneath and are attached to the rigid sidewall members, and additional water jet propulsion unit may be mounted on the bottom of the reaction control surfaces. Preferably the flexible skirt means at the bow and along the longitudinal sides is comprised of upper flexible inflated members attached to the vehicle and a plurality of discrete segments attached to and depending downwardly from the upper members.

Figure 2:
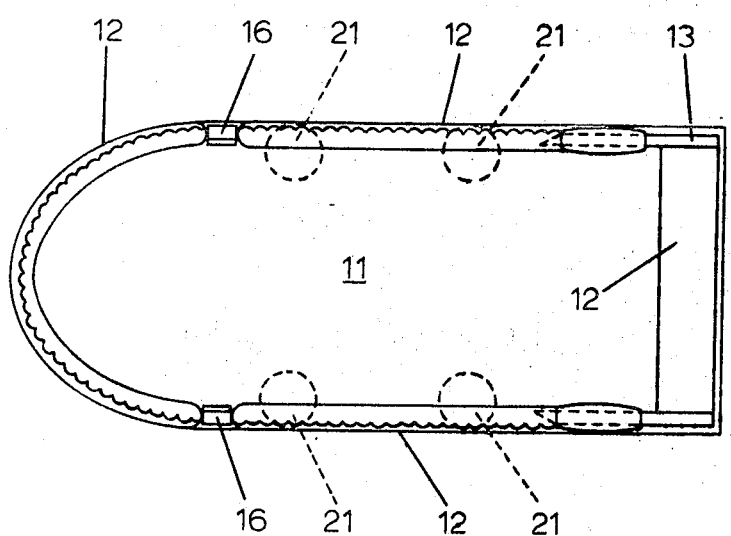
Figure 3:
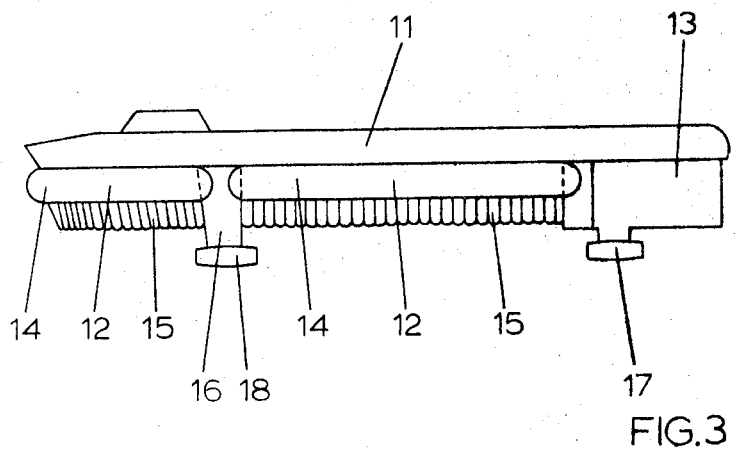
Figure 4:
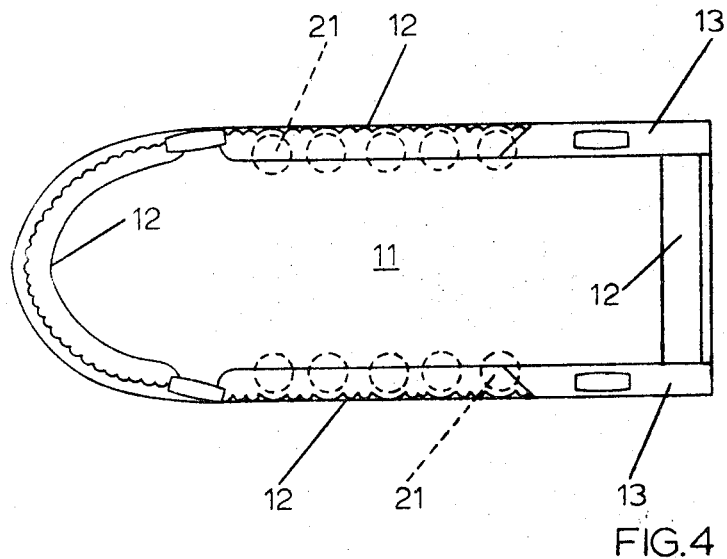
Figure 5:
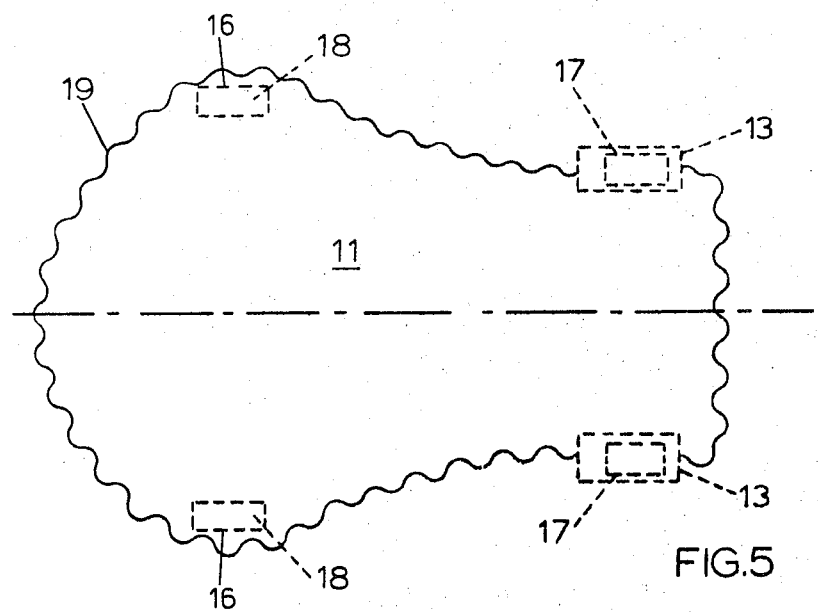
Figure 6:
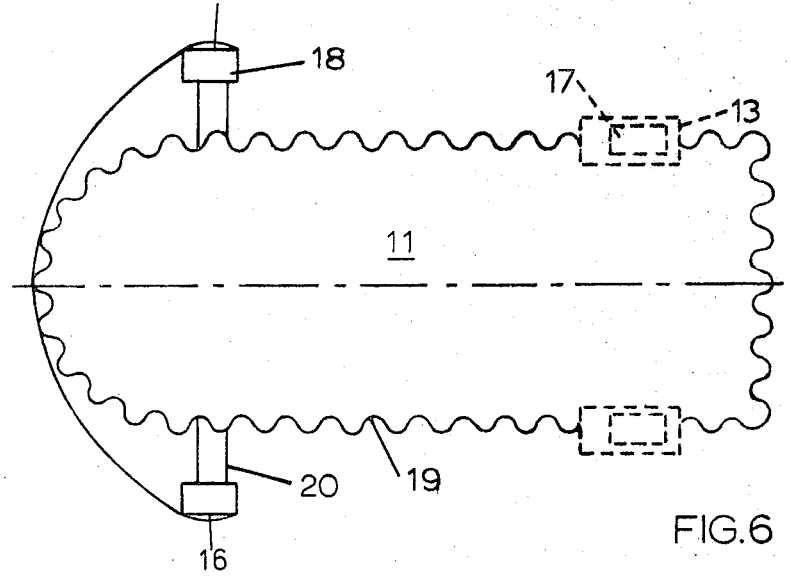

Various embodiments of the invention will now be described, by way of example only, with reference to the accompanying drawings, in which:

FIG. 1 is a schematic side elevation of one embodiment of a fluid cushion supported vehicle in accordance with the invention, FIG. 2 is a schematic plan looking on the underside of the vehicle shown in FIG. 1, FIG. 3 is a schematic side elevation of a second embodiment of a fluid cushion supported vehicle in accordance with the invention, FIG. 4 is a schematic plan looking on the underside of the vehicle shown in FIG. 3, and FIGS. 5 and 6 are schematic plans of third and fourth embodiments of fluid cushion supported vehicles.

Referring to FIGS. 1 and 2, there is shown a vehicle 11 which receives support from a cushion of pressurized fluid positioned beneath the vehicle 11. In this embodiment the pressurized fluid is air supplied by lift fans 21. Propulsion means for the vehicle are provided by water jet propulsion units 17 which extend downwardly beneath, and are attached to, rigid sidewall members 13. Directional control may be by means of movable control surfaces (not shown) on the discharge side of the water jet propulsion units 17, pressurized air discharge ports (not shown) on the sides of the vehicle 11, or suitable aerodynamic control surfaces (not shown). Around the bow and along the forward part of the longitudinal sides of the vehicles, means for preventing escape of the cushion of pressurized air are provided in the form of a flexible skirt assembly 12. Along the remaining length of the longitudinal sides of the vehicle 11 the means for preventing escape of the cushion are rigid sidewall members 13 which may penetrate or plane over a water surface when the vehicle is operational and supported on the cushion. The means for preventing escape of the cushion of pressurized air at the rear of the vehicle 11 comprises a flexible skirt assembly 12 which extends between the rigid sidewall members 13. The flexible skirt assembly 12 at the bow and along the longitudinal sides of the vehicle 11 is comprised of upper flexible inflated members 14, attached to the vehicle 11 by suitable means (not shown), and a plurality of discrete segments 15 attached to and depending downwardly from the upper members 14. The flexible skirt assembly 12 across the rear of the vehicle 11 may be of similar construction or of any other suitable form.

At that point, on each side of the vehicle longitudinal centre line and forward of the vehicle lateral centre line, where the flexible skirt assembly extending around the bow meets the flexible skirt assembly extending along the longitudinal side, known to those skilled in the art as a 'tan' point, a reaction control surface 16 shaped so as to give minimum resistance to forward movement of the vehicle and maximum resistance to lateral movement of the vehicle is provided. These control surfaces 16 are of rigid construction and are attached to the vehicle 11 so as to extend downwardly therefrom and penetrate a water surface over which the vehicle is travelling, thus giving additional directional stability to the vehicle by providing lateral resistance points at the forward end thereof.

By providing the control surfaces 16 in the flexible skirt line at the tan points, they act as valuable support structure for the upper members 14 of the flexible skirt 12 at points of inherent weakness.

If desired, the control surfaces 16 may be made pivotal about a vertical axis so that they can be controlled by the vehicle commander to give directional control forces. The lower part of each surface 16 may be set at an angle to the vertical so that when it is pivoted to turn the vehicle an inward rolling force is generated.

In an embodiment of the invention not shown the rigid sidewall members 13 of the vehicle shown in FIGS. 1 and 2 are replaced by a continuation of the flexible skirt assembly 12, so that the vehicle is fully flexible skirted. In this embodiment propulsion is provided by means of air jets or air propellers and the control surfaces 16 are made to fold or retract so that the vehicle can become amphibious and operate over land. The particular arrangement by which the reaction control surfaces 16 are retracted and extended does not form a part of the invention and is not described. Any suitable well known method or arrangement may be used.

Referring now to FIGS. 3 and 4, there is shown a vehicle which is, in general, of similar construction to that shown in FIGS. 1 and 2. However, additional propulsion means in the form of water jet propulsion units 18 are mounted on the bottom of the control surfaces 16. When fitted with propulsion units 18 it is preferable that the control surfaces 16 should be fixed and the power units orientated at an angle to the longitudinal centre line of the vehicle so that their efflux is clear of, and does not cause wake interference with, the rear mounted units 17.

In the embodiment shown in FIG. 5 the vehicle 11 has a somewhat pearshaped planform, being wider at the front than at the rear. The waving line 19 represents the outline of the cushion boundary formed by a flexible skirt assembly and the rigid sidewall members 13. Water jet propulsion units 17 are attached to the bottom of the sidewall members 13. The reaction control surfaces 16 are positioned beneath the vehicle at the widest part so as to be inside of the cushion area. Water jet propulsion units 18 are mounted on the bottom of the control surfaces 16, and because the control surfaces 16 are set wider apart than the sidewall members 13 efflux from the forward propulsion units 18 does not cause wake interference with the rear propulsion units 17.

In the embodiment shown in FIG. 6 the peripheral outline of the vehicle 11, represented by the waving line 19, is of conventional shape having parallel longitudinal sides. The control surfaces 16 are positioned outside of the cushion area, being mounted on a suitable arrangement of struts 20. Water jet propulsion units 18 are mounted on the bottom of the control surfaces 16. The vehicle has rigid sidewall members 13 along the rearmost length of the longitudinal sides and water jet propulsion units 17 are mounted beneath the sidewall members 13.

I claim as my invention:

1. A vehicle which during operation receives support from a cushion of pressurized fluid situated beneath the vehicle, the vehicle having propulsion means, means of directional control, and means depending downwardly from and extending around the periphery of the vehicle to prevent escape of the cushion of pressurized fluid, said means for preventing escape of the cushion around the vehicle bow and along at least part of the vehicle longitudinal sides comprising flexible skirt means, wherein at least two reaction control surfaces shaped so as to give minimum resistance to forward movement of the vehicle and maximum resistance to lateral movement of the vehicle are positioned one on either side of the vehicle longitudinal center line and forward of the vehicle lateral center line, at that point on each side of the vehicle where the flexible skirt means extending around the vehicle bow meets the flexible skirt means extending along the vehicle longitudinal sides so as to act as support structure for the flexible skirt means at these points, and so as to extend downwardly from rigid structure of the vehicle and penetrate a water surface over which the vehicle is travelling to provide a component of directional stability.

2. A vehicle as claimed in claim 1 wherein rigid sidewall members extend along those parts of the longitudinal sides which are at the rear end of the vehicle.

3. A vehicle as claimed in claim 2 wherein the propulsion means comprise water jet propulsion units which extend downwardly beneath and are attached to the rigid side wall members.

4. A vehicle as claimed in claim 3 wherein additional water jet propulsion units are mounted on the bottom of the reaction control surfaces.

5. A vehicle as claimed in claim 1 wherein the reaction control surfaces are pivoted about a vertical axis so as to provide directional control.

6. A vehicle as claimed in claim 1 wherein at least portions of said flexible skirt means are formed of a plurality of discrete segments.

7. A vehicle as claimed in claim 1 wherein the flexible skirt means at the bow and along the longitudinal sides is comprised of upper flexible inflated members attached to the vehicle and a plurality of discrete segments attached to and depending downwardly from the upper members.

* * * * *